A. E. LANG.
SANITARY GARBAGE RECEIVER.
APPLICATION FILED SEPT. 16, 1915.
1,195,034.
Patented Aug. 15, 1916.
2 SHEETS—SHEET 2.
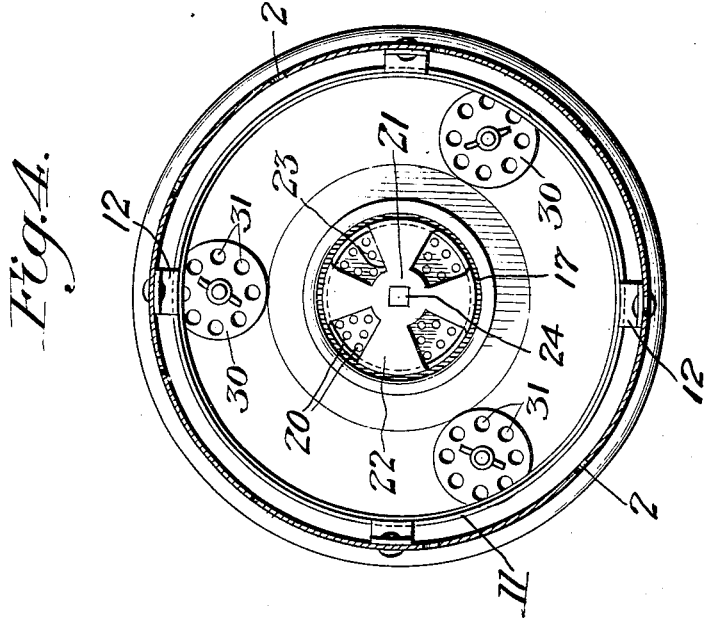
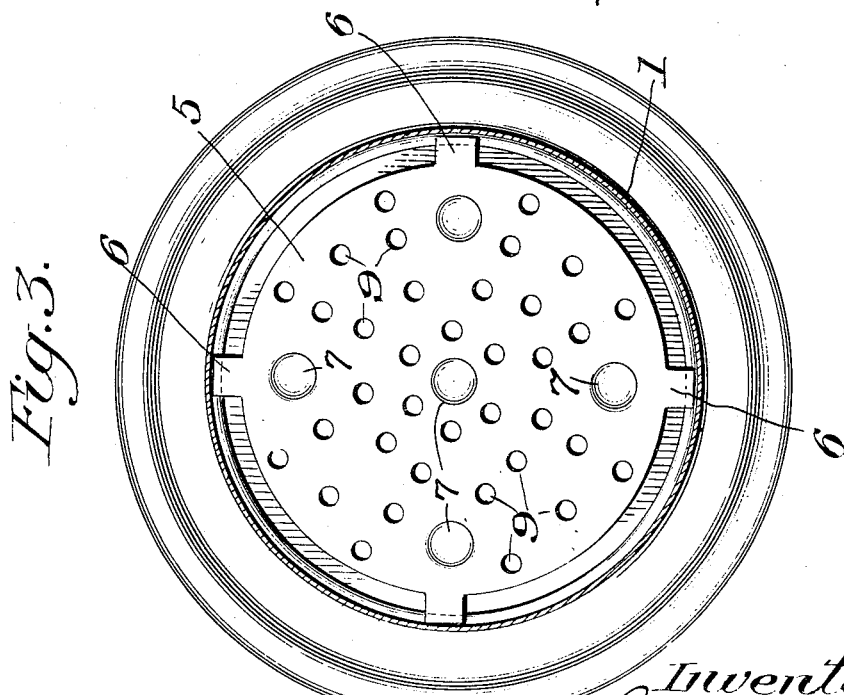

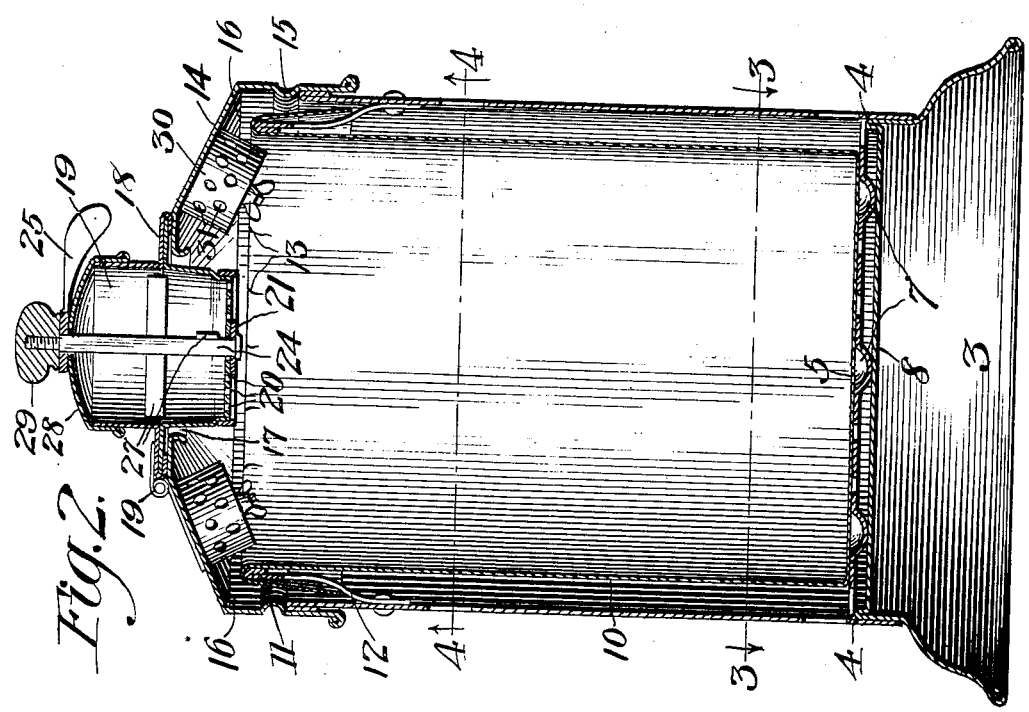

UNITED STATES PATENT OFFICE.

ANTHONY EDWARD LANG, OF BUFFALO, NEW YORK.

SANITARY GARBAGE-RECEIVER.

1,195,034.

Specification of Letters Patent.  Patented Aug. 15, 1916.

Application filed September 16, 1915.  Serial No. 51,005.

*To all whom it may concern:*

Be it known that I, ANTHONY E. LANG, a citizen of the United States, residing at Buffalo, county of Erie, and State of New York, have invented certain new and useful Improvements in Sanitary Garbage-Receivers; and I do hereby declare the following to be a full, clear, and exact description of the invention, such as will enable others skilled in the art to which it appertains to make and use the same.

This invention relates to garbage receivers of the sanitary type and has for its object to provide an improved garbage receiver comprising, in its preferred form, an outer perforated casing in which there is supported a destroyable inner receptacle for receiving the garbage. The inner receptacle is preferably made of paper, and instead of being supported directly upon the bottom of the casing, is supported upon a false perforated bottom. The bottom of the paper receptacle is, therefore, spaced from the bottom of the casing which permits a free circulation of air under the bottom of the paper receptacle. The bottom of the paper receptacle is, therefore, not as likely to rot and be as short-lived as if the paper receptacle were supported directly upon the bottom of the casing and came in contact with moisture collected at the bottom of the casing.

The side walls of the paper receptacle are spaced from the walls of the casing, so that there is also permitted a circulation of air in the space formed between the walls of the casing and the walls of the paper receptacle. The paper receptacle is so supported within the casing and the top of the garbage receiver is so applied to the casing that there is an unobstructed circulation of air from the above-named space between the walls of the casing and the walls of the paper receptacle to the space in the upper portion of the receiver. There is preferably provided a removable top for the casing, and to this there is hinged a cover, which, when opened, permits the depositing of garbage or other refuse into the paper receptacle. The hinged cover has associated therewith, a receptacle for carrying a germicide, the lower portion of the receptacle being perforated to permit some of the germicide powder to drop into the paper receptacle each time the cover is closed. A regulable closure provided at the bottom of the receptacle renders it possible to close the openings in the bottom of the germicide receptacle and prevent sprinkling or dropping of the germicide powder into the paper receptacle. There is also preferably associated with the germicide receptacle, a stirrer or mixer which, when actuated, agitates the germicide powder and prevents the same from caking. This feature, in combination with the feature of permitting a free circulation of air entirely around the paper receptacle and by the lower portion of the germicide receptacle, keeps the germicide powder in a flocculent condition, as the stirrer will break up the powder, if there is any tendency for the same to cake, and the circulation of the air will lessen the tendency of the germicide powder to cake due to the absorption of moisture.

The invention is illustrated in the accompanying drawing, in which:—

Figure 1 is a side elevation of the improved garbage receiver; Fig. 2 is a vertical section through the same; Fig. 3 is a horizontal section taken on the line 3—3 of Fig. 2; and Fig. 4 is a horizontal section taken on the line 4—4 of Fig. 2.

Referring to the drawings, the outer casing above referred to is shown at 1 and is provided with a plurality of openings 2 for the introduction of air. The casing 1 is preferably made cylindrical in shape and at its lower portion slips over the upper edge of a base 3.

The upper peripheral edge 4 of the base 3 aids in supporting the false bottom 5, as will be clear from Figs. 2 and 3. It will be noted that the false bottom 5 is provided with radially-extending projecting portions 6 which rest upon the peripheral edge 4 of the base 3. Downwardly projecting portions 7 on the false bottom 5 engage with the upper surface 8 of the bottom 3, and thereby aid in supporting the weight of the paper receptacle and its contents and serve to aid in spacing the false bottom 5 from the upper portion 8 of the bottom 3.

The false bottom 5 is perforated, as shown at 9, so that any moisture collected in the bottom of the paper receptacle may drain on to the surface 8 and be held under the false bottom 5 in the basin formed by the upstanding peripheral edge portion 4 and the top portion 8 of the bottom 3. If ever found necessary, the casing 1 may be removed from the base portion 3 and the collected moisture removed from the basin formed as just described.

The inner paper receptacle 10 above mentioned is supported directly upon the false bottom 5, as shown in Fig. 2. The upper edge portion of the paper receptacle 10 may be bent outwardly and backwardly over a ring 11 supported from the casing walls by means of the arms 12. In order to facilitate the bending of the edge portion of the receptacle over the ring 11, the edge portion of the paper receptacle may be slitted, as shown at 13. The bending of the edge portion over the ring 11 is for the purpose of permitting application of a top 14 to the casing 1. The edge portion of the paper receptacle, when again bent upwardly, provides a place for the receptacle to be gripped and removed from the casing. If the top edge of the paper receptacle ended flush with the ring 11, it would be difficult to remove the paper receptacle from the casing.

The top 14 just referred to slips over the upper edge of the casing 1 and is provided with an inwardly directed circumferential bead or projection 15 to limit the downward movement of the top with respect to the casing 1. This is for the purpose of preventing the top from coming in contact with the upper edge of the paper receptacle, and thereby cutting off the circulation of air from the space between the walls of the casing and the walls of the paper receptacle to the space under the top 14. As will be noted from Fig. 2, when the top 14 is forced all the way on to the casing 1, there will still remain a space 16 between the top edge of the paper receptacle 10 and the top 14, by which air may circulate. The top 14, when removed, permits removal of the paper receptacle and substitution of a new receptacle or replacing of the same one.

The removable top 14 is provided with a central opening 17 through which the refuse may be deposited in the receptacle 10. The opening 17 is normally closed by a closure 18 hinged to the top 14 at 19. The closure 18 has a germicide receptacle 19 associated therewith, the upper portion of which projects above the top 14 when the closure 18 is in its closed position, and the lower portion of which projects into the interior of the top 14 through the opening 17, when the closure 18 is in its closed position, as clearly shown in Fig. 2. The germicide receptacle itself practically forms the closure for the opening 17, but to effect a better closure, the germicide receptacle is so formed as to present a flange 18, which is above referred to as the closure itself. When the closure or flange 18 is opened, the germicide receptacle 19, of course, swings bodily with it about the hinged connection 19 and permits depositing of refuse in the paper receptacle 10 through the opening 17.

The bottom of the germicide receptacle 19 is provided with a plurality of perforations 20, through which some of the germicide powder drops or sprinkles each time the closure, constituted by the flange 18 and the receptacle 19, is lowered. The jar or jolt incident to the closing of the closure 18 causes some of the germicide powder to drop through the perforations 20 on to the garbage or other refuse contained in the paper receptacle 10.

As will be noted from Fig. 4, the perforations 20 in the bottom of the germicide receptacle 19 are arranged in a plurality of groups so that a rotatable shutter 21, having a plurality of closed portions 22 and a plurality of open portions 23 is capable, in one position, of closing all of the perforations 20, and in another position uncovers the perforations 20.

The shutter 21 is secured to the lower extremity of a vertical shaft or rod 24 coaxially with respect to the germicide receptacle 19. The rod 24 is actuated by means of a hand-lever 25 secured to the upper extremity of the rod. A line or other indication 26 may be placed on the outer surface of the germicide receptacle to indicate the position which the hand-lever 25 should assume when the perforations 20 are closed, and a similar line, not shown in the drawing, indicates the position which the hand-lever 25 should assume when the perforations are open. Obviously any other means may be used for indicating the proper positions of the handle 25 corresponding to the different positions of the shutter 21. When the rod or shaft 24 is actuated to turn the shutter 21, it also actuates a plurality of stirrers or mixers 27 secured at right angles to the rod 24. These stirrers 27, in rotating, serve to keep the germicide powder in a pulverulent condition and prevent the same from caking.

The germicide receptacle 19 is provided with a cover 28 which may be removed to admit germicide powder to the receptacle 19. The cover 28 may be retained in place by means of a thumb-nut 29 screwed on to the upper extremity of the shaft 24 above the hand-lever 25, as will be clear from Fig. 2.

Secured to the under surface of the removable top 14 are a plurality of deodorant receptacles 30. These may be of any suitable shape and are perforated, as indicated at 31, to permit the air within the garbage receiver to come in contact with the deodorant within the receptacles.

It will be seen from the foregoing description that air admitted to the interior of the casing 1 through the openings 2 is permitted to circulate entirely around the paper receptacle. The false bottom 5 is supported within the casing in such a manner that the air has a free and unobstructed circulation from the space between the walls of the casing and the walls of the paper receptacle under the false bottom 5. The bottom of the paper receptacle is, therefore, supported above any moisture which is likely to collect on the surface 8 and the air circulating below the bottom of the paper receptacle greatly lengthens the life of the paper receptacle. The air admitted through the openings 2 also has a free and unobstructed circulation over the top of the paper receptacle through the space 16 and comes in contact with the deodorant carried in the receptacles 30. The deodorant receptacles 30 may not even be necessary, as the unobstructed air circulation through the receiver will render the same practically odorless. Furthermore, as the air is permitted to circulate by the germicide receptacle 19, there will be little tendency for the germicide powder to cake, even if the perforations 20 are left open. It is preferable, however, that the shutter 21 should be left in such a position as to close the perforations 20 at all times, except when it is desired that the closing movement of the receptacle 19 should cause some of the germicide powder to sprinkle into the receiver. With the shutter 21 closed, there is very little possibility of the germicide powder caking and the provision of the stirrers or agitators 27 keep the powder in a flocculent condition, even if there is a tendency for the same to cake.

The air circulation above described not only renders the garbage receiver sanitary and practically odorless, but it also prevents "sweating" of the interior surfaces of the receiver. It has been found in practice that in garbage receivers having no air circulation, large drops of moisture form upon the interior surfaces of the receiver, and this is obviously disadvantageous for many reasons. When a germicide receptacle is employed, the large drops of moisture which collect on and in the vicinity thereof, increase the tendency of the germicide to cake. Due to the air circulation in the present construction, these disadvantages are overcome.

The paper receptacle 10 is not supported from the ring 11, but is supported upon the false bottom 5, as it would be likely to tear if supported from above. When the paper receptacle 10 is filled and it is desired to remove the same, the top 14 is removed and the paper receptacle removed in the manner above described. When the paper receptacle is replaced, or a new one substituted, the top edge of the paper receptacle, which permits removal of the receptacle, is bent outwardly and downwardly around the ring 11, as shown in Fig. 2, so as to leave the space 16 unobstructed when the top 14 is positioned on the casing.

Obviously numerous modifications and changes may be made in the details of the construction wihout departing from the spirit or scope of the invention, as defined in the accompanying claims.

What I claim is:—

1. A sanitary garbage receiver comprising a casing, a false perforated bottom spaced from the bottom of the casing, and a destroyable receptacle supported on said false bottom.

2. A sanitary garbage receiver comprising a perforated casing, a false perforated bottom in said casing, and a destroyable receptacle supported on said false bottom and having its walls spaced from the walls of the casing.

3. A sanitary garbage receiver comprising a casing, a false perforated bottom in said casing, and a destroyable receptacle supported on said false bottom and having its walls spaced from the walls of the casing.

4. A sanitary garbage receiver comprising a casing having a removable top and a perforated false bottom, and a destroyable receptacle supported on said false bottom and having its walls spaced from the walls of the casing, the top edge of the receptacle being spaced from the top of the casing for the purpose described.

5. A sanitary garbage receiver having a germicide receptacle associated with its upper portion, the bottom of said receptacle having an opening through which some of the germicide may drop to the garbage receiver, a closure for said opening, and means to agitate the germicide in the receptacle, for the purpose described.

6. A sanitary garbage receiver having a germicide receptacle associated with the upper portion, the bottom of said receptacle having an opening through which some of the germicide may drop to the garbage receiver, a closure for said opening, means to operate said closure to open and close said opening, and an agitating element in said receptacle adapted to be operated upon actuation of said means.

7. A sanitary garbage receiver having a germicide receptacle associated therewith, said receptacle having an opening through which some of the germicide may drop into the receiver, a closure for said opening, means to open and close said closure comprising a stem passing through the receptacle, and a cross piece secured to said stem to agitate the contents of the receptacle when said closure is actuated.

8. A sanitary garbage receiver comprising a perforated casing, a false bottom positioned in the casing, and a paper receptacle supported on said false bottom with its walls spaced from the walls of the casing.

9. A sanitary garbage receiver comprising a perforated casing, a false bottom positioned in the casing, a paper receptacle supported on said false bottom with its walls spaced from the walls of the casing, and a ring supported in the casing near the top thereof to encircle the upper portion of the paper receptacle.

10. A sanitary garbage receiver comprising a perforated casing, a false bottom positioned in the casing, a paper receptacle supported on said false bottom with its walls spaced from the walls of the casing, and a germicide receptacle associated with the casing.

11. A sanitary garbage receptacle comprising a casing, a base detachably supporting said casing and having a moisture-receiving portion, a false bottom supported by said base, and an inner receptacle supported on said false bottom.

In testimony whereof I affix my signature.

ANTHONY EDWARD LANG.